Figure 1:
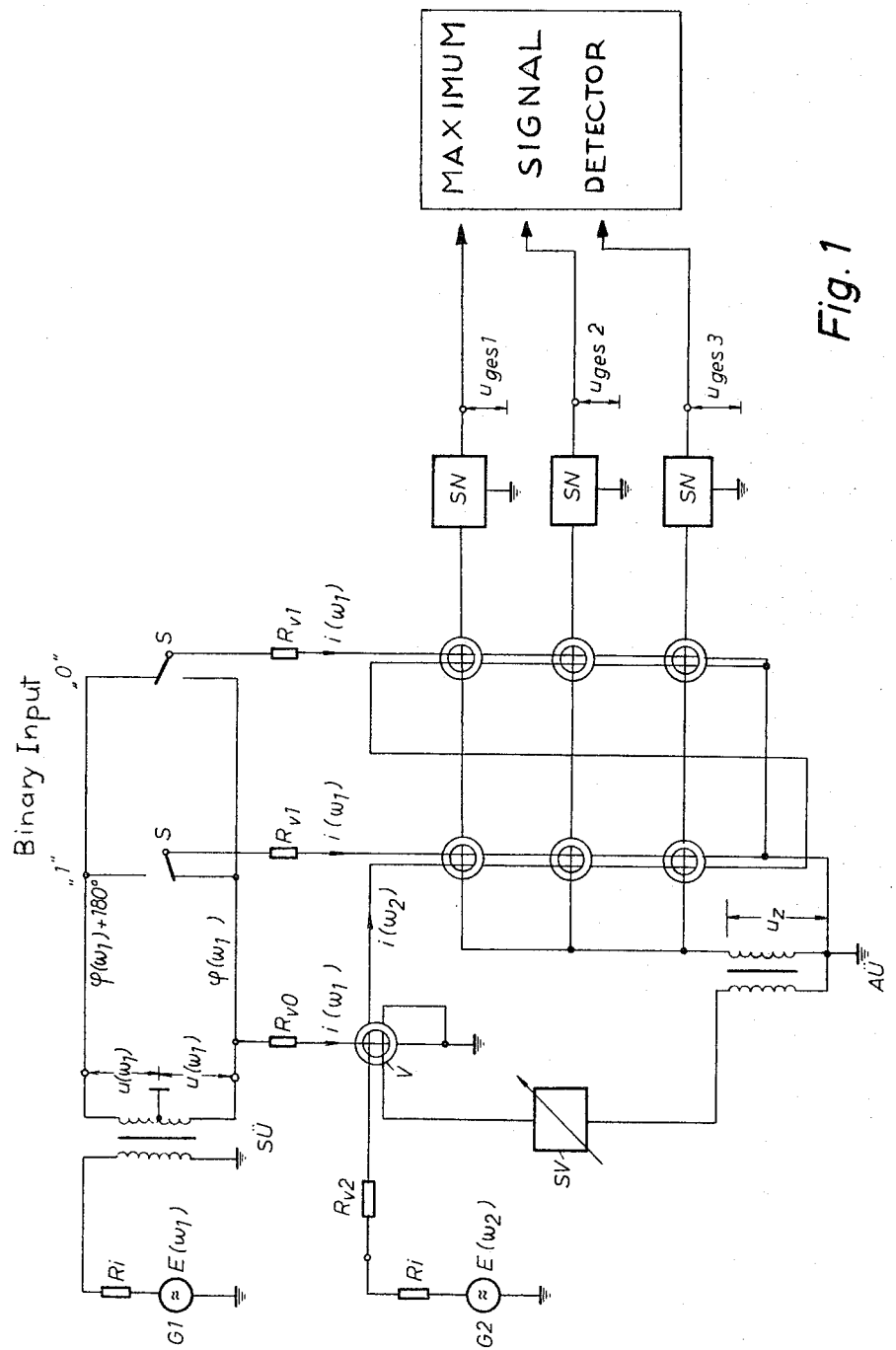

March 21, 1967 K. STEINBUCH ETAL 3,310,789
NON-DESTRUCTIVE READ-OUT MAGNETIC-CORE TRANSLATING MATRICE
Filed Aug. 2, 1963 2 Sheets-Sheet 1

INVENTORS
KARL STEINBUCH
H. J. HONERLOH

BY Percy P. Lantz
ATTORNEY

United States Patent Office 3,310,789
Patented Mar. 21, 1967

3,310,789
NON-DESTRUCTIVE READ-OUT MAGNETIC-CORE TRANSLATING MATRICE
Karl Steinbuch, Ettlingen, Baden, and Hans Jürgen Hönerloh, Karlsruhe, Baden, Germany, assignors to International Standard Electric Corporation, New York, N.Y., a corporation of Delaware
Filed Aug. 2, 1963, Ser. No. 299,643
Claims priority, application Germany, Aug. 8, 1962, St 19,580
4 Claims. (Cl. 340—174)

In co-pending patent application Serial No. 137,490, filed Sept. 8, 1961 (K. Steinbuch, W. Jaenicke, and H. Reiner), there is described a matrix-translating device having a learning character, in which sets of binary signals corresponding to certain variable conditions are applied in combination to the column leads of the matrix during the so-called learned or confirming phase, and in which row translating elements at the cross points of the matrix are adapted to respond in combination so as to produce a unique output on one of the row leads. As cross-point elements, there may be used magnetic cores which are driven incrementally towards saturation in the course of several steps. The interrogation of the thus formed matrix during the learned or confirming phase must be effected in a non-destructive manner in order to ensure that the learned information items are available a random number of times.

Moreover, it is described in the above patent application that the interrogation of the storage cores can be effected, e.g., in the conventional manner in accordance with the harmonic method. If one winding of a core is supplied with an alternating current, at a sufficiently high frequency $\omega$, then it is possible to take off at a second winding, besides the induced fundamental wave $\omega$, the harmonic $2\omega$ which is due to the non-linearity of the permeability of the core. The phase relation $\rho(2\omega) = 0$ or $\rho(2\omega) = 180°$ of the harmonic signal is dependent upon the state of magnetization of the storage element, and therefore provides an indication as to whether a binary zero or a binary one (1) is stored in the respective core.

By comparison with the phase of a reference signal, in a phase-sensitive readout arrangement, it is then possible to determine the intelligence stored in the storage device. The readout is non-destructive if the frequency $\omega$ is chosen so high that the fundamental signal, alone, is incapable of changing the polarity of the core, or respectively, in the case of a relatively low frequency, for which ordinarily the states of remanence of the storage cores are capable of following the polarity reversals of the signal, if the amplitude of the fundamental signal is so small that it is incapable of causing a continuous polarity reversal of the core.

Another possibility for obtaining non-destructive readout (interrogation) of individual magnetic cores consists in supplying two input windings with two alternating currents of different frequency $\omega_1$ and $\omega_2$, or in supplying one winding with an additive combination of the two frequencies, so that due to the non-linearity of the B-H characteristic of the core material, there are formed in one output winding both the sum and difference frequencies, ($\omega_1+\omega_2$) and ($\omega_1-\omega_2$), the amplitudes of which, again in dependence upon the core condition, exhibit a binary phase characteristic. By determining the phase of the output frequency, it is therefore possible to determine whether a binary 1 or 0 was stored in the respective core. This method which is known to be satisfactory for sensing an individual core has the disadvantage that it is only applicable to small core matrices; this is due to the fact that the sensed signal amplitudes are very small and, consequently, difficult to evaluate, especially in the case of large-size matrices, because then the noise signals likewise become greater, whereas the useful signal produced in the single interrogated core, remains of the same size, so that there will result a more unfavorable relationship between the useful signal and the noise signal.

The present invention now utilizes the above known principles for effecting non-destructive matrix readout, but is based on the observation that while this method is not useful for interrogation of individual cores in a large storage matrix, it is useful for interrogation of additively effective rows of cores in a translation matrix, it still being necessary to determine the row having the most distinctive output, providing that certain modifications of the conventional type of readout method are employed.

The essential feature of the present invention involves an application to the column leads of the matrix of a radiofrequency current $i(\omega_1)$ with a phase relation $\rho(\omega_1)$, where the intelligence corresponds to binary 1, and a radiofrequency current $i(\omega_1)$ at a phase $\rho(\omega_1)+180°$, for binary 0 or vice versa and an application to a second winding which, e.g., may be threaded in common through all cores of a radiofrequency current at a different frequency $i(\omega_2)$ and in summing-up on the row leads the output voltages translated by the individual row cores of the combination frequency $\omega_S=\omega_1+\omega_2$ or $\omega_D=\omega_1-\omega_2$, respectively, as resulting in the case of an equivalence between the offered signals and the signals as stored in the cores, and in determining the particular row with the greatest resemblance in a maximum detection circuit.

Accordingly, in the present inventive arrangement not all columns are acted upon by currents of equal phase relation, as is the case in conventional types of arrangements, but there are used currents having two different phase relations and, in accordance with the binary value, the current is fed into the column with either the one or the other phase. Hence, at the feeding-in of a current of different frequency into the second winding, there will result voltages of the combination frequencies with different phase relations, with the phase relation, however, not only being dependent upon the condition or state of the core, but also on the phase relation of the fed-in current on the column leads. In the case of coincidence between the binary values of the applied signal and the signal as stored in the core, there will result the phase relation $\rho=0$ as opposed to the phase relation $\rho=180°$ in the case of a non-coincidence. Accordingly, in that particular row bearing the greatest resemblance to the applied set of signals assigned to certain properties, there will prevail those output signals having the phase relation $\rho=0$. The amplitude of the row summation voltage having this particular phase relation, reaches a maximum which is significantly distinct from other row outputs, so that this row can be ascertained or detected with the aid of a maximum-detection circuit.

When applying this method to learning matrices, there will not appear the above mentioned disadvantages relating to the single-core interrogation, because the useful signals of the cores of a whole row are summed-up, so that on one hand the total useful signal becomes substantially greater and, on the other hand, the signal-to-noise ratio becomes smaller. In the case of an enlargement of the matrix, the useful signal increases linearly with the number of columns, whereas the signal-to-noise ratio will remain almost constant.

It is appropriate, to use not the summation frequency, but the difference frequency for the evaluation purpose, because by suitably selecting the frequencies $\omega_1$ and $\omega_2$, the difference frequency $\omega_D$ can always be made so small with respect to $\omega_2$ or $\omega_1$, respectively, that the evaluation of the difference frequency can be effected at the row output with the aid of simple filter circuits. With respect to the harmonic method, in which the selection currents may only have a very low distortion, because the first harmonic $2\omega$ represents the useful signal, this method has the further advantage that in the difference frequency method there are allowed random distortion factors, because the useful signal of the frequency $\omega_D$ is only produced by the non-linearities of the magnetic core material, and is thus not affected by the selection signal generators. One possibility which is not fully utilized by the conventional types of difference frequency methods, is the evaluation of the amplitude of the useful signals, which may be advantageously utilized for determining the amount of remanent induction of the cores. For effecting the proper phase demodulation of the difference signal it is possible to use, in the conventional manner, ring-type modulators. One appropriate method of effecting the demodulation, however, consists in adding to the row-output voltages an additional voltage with such an amplitude and frequency that there will only appear the voltages with the phase relation $\rho=0$. In this case it is sufficient to discriminate the amplitude of the difference frequency voltage, so that simple types of low-pass filters can be used at the output leads of the rows. Instead of the low-pass filters it is also possible to use resonance transformers for selecting the difference frequency.

For feeding-in the radiofrequency currents with the proper phase relation in accordance with the binary value, there may be used a common radiofrequency generator, provided that the feed-in is effected via a balancing transformer. In this case there may be provided switches which serve to connect the column leads, quite depending on the binary value of the selection signals, either to the one or the other side of the secondary winding of the balancing transformer. These switches may be composed of electronic means.

Figure 2:
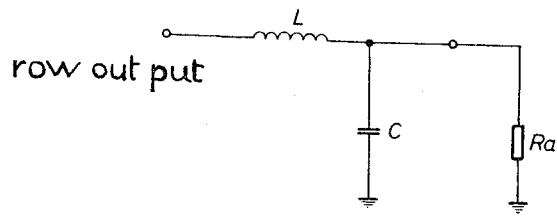
Figure 3:
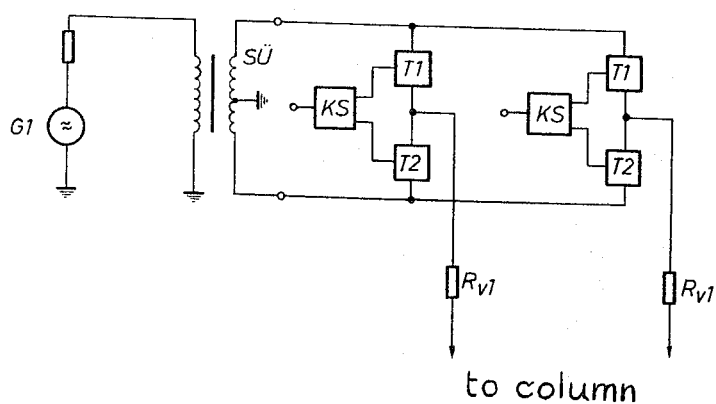

In the following the invention will now be explained in detail with reference to FIGURES 1 to 3 of the accompanying drawings, in which:

FIGURE 1 schematically shows a circuit arrangement for carrying out the method according to the invention, FIGURE 2 shows a low-pass filter for selecting the difference frequency $\omega_D$, and FIGURE 3 shows a type of embodiment of the switch as used for switching-over the radiofrequency current $i(\omega_1)$ with the phase relation $\rho(\omega_1)$ to the radiofrequency current $i(\omega_1)$ with the relation $\rho(\omega_1)+180°$.

FIGURE 1 shows the circuit arrangement necessary for carrying out the learned or confirming phase, with reference to the example of a simplified learning matrix comprising six ring-type or toroidal cores, having non-linear hysteresis characteristics, which are arranged at the intersections of two columns and three rows. The radiofrequency generator $G_1$ supplies at the two outputs of the secondary winding of the balancing transformer SÜ, two voltages of the same amplitude $u(\omega_1)$ with the phase relations $\rho(\omega_1)$ and $\rho(\omega_1)+180°$. These two voltages with different phase relations are used for signifying the two binary values 0 and 1, in other words, in the presence of a 1 in the applied set of signals assigned to certain properties, a current with the phase $\rho(\omega_1)$, and in the case of the binary 0, a current with the phase $\rho(\omega_1)+180°$ is fed into the respective column. To this end the column leads may be connected, via the symbolically represented switches S, to the respective output of the transformer SÜ. In FIGURE 1 the switches S are set to effect the input of the set of signals "1, 0."

On account of this, radiofrequency currents $i(\omega_1)$ with the chosen phase relation, flow into the column leads via the series resistors $R_{v1}$. The second radiofrequency generator $G_2$, via the series resistors $R_{v2}$, produces a radiofrequency current $i(\omega_2)$ which flows through all of the cores, because its phase relation is supposed to be equal with respect to all columns. Each core induces in the row lead passing therethrough, a useful signal $u(\omega_D)$ with equal amplitude $\hat{u}(\omega_D)$, but with a different phase relation $\rho(\omega_D)$ in the case of an equivalence, or $\rho(\omega_D)+180°$ respectively in the case of an antivalence between the binary values of the column current and the remanent saturation induction $\pm B_s$, which was stored into the cores during the learned or confirming phase. In this case there is only stated the difference frequency, because only this frequency is supposed to be evaluated, as will be described hereinafter; the summation frequency has not been considered.

If the number of columns is indicated by $n$, and the sum of antivalences of one row by $d$ (Hamming distance), then the summation useful voltage $u_s$, as can be easily proved, has the following amplitude at the output of the row:

$$\hat{u}_s = |n-2d| \cdot \hat{u}(\omega_D)$$

In this way there will result, with respect to the row having most of the equivalences, a summation signal with the maximum amplitude and the phase relation $\rho(\omega_D)$, and at the same time, however, with respect to the row having the same number of antivalences but, in this particular case with the phase relation $\rho(\omega_D)+180°$. For this reason the row with the greatest coincidence, or matching characteristic—that is, with most equivalances—cannot be determined solely by amplitude discrimination, but also a phase discrimination operation must be executed in order to eliminate row voltages with the phase relation $\rho(\omega_D)+180°$. To this end it is possible, in the conventional way, to use ring-type modulator arrangements.

FIGURE 1, however, still shows a more appropriate circuit arrangement for effecting the phase discrimination. For this purpose there is provided a comparison core V with a constant fixed remanence induction which is supplied via its first input winding in the same way as the cores of the matrix, with the current $i(\omega_2)$, and via the series resistor $R_{v0}$, and via the secondary winding, with the current $i(\omega_1)$ having the phase relation $\rho(\omega_1)$. To its readout winding there is connected a selective amplifier SV which is tuned to the frequency $\omega_D$ and, via the matching transformer AÜ, applies an additional voltage $u_z$ with the amplitude $n \cdot \hat{u}(\omega_D)$ and the phase relation $\rho(\omega_D)$, to the common intersection of all row wires. Thus, the total useful voltage of one row becomes $u_{ges} = u_s + u_z$ and its amplitude
$\hat{u}_{ges} = 2(n-d) \cdot \hat{u}(\omega_D)$.

Accordingly, in this case there will no longer appear significant voltages in the rows having the phase relation $\rho(\omega_D)+180°$, so that only the amplitudes remain to be evaluated, and the significant signals $u_{ges}$ can be discriminated from the induced fundamental wave voltages, and from noise signals, with the aid of simple selective networks SN at the outputs of the rows. With the aid of the maximum signal detection circuit shown in block form it is possible to ascertain the row having the greatest total useful voltage $u_{ges}$. Such maximum signal detection circuits are well known, a suitable example being provided in a publication entitled, "A Matched Filter Detection System for Complicated Doppler Shifted Signals," by R. M. Lerner, appearing in the IRE Transactions on Information Theory, June 1960, pages 373 to 385. Note in particular FIGURE 10 and the discussion thereof on page 383 of this reference, wherefrom it is seen that upon feeding a plurality of signals to the control grids of a corresponding plurality of cathode followers having a common cathode resistor, only that cathode follower having the greatest input will conduct. Thus, by examining all plate circuits of these cathode followers for conduction, the input lead having the greatest signal is easily identified. The thus detected row of matrix is indicative of the greatest resemblance or matching characteristic with reference to the applied binary set of signals assigned to certain properties.

Of the frequencies appearing in the output voltage of the rows, one useful output frequency (signal frequency) $\omega_D$ is the lowest one; for this reason it is possible to use for the selective networks SN, low-pass filters as shown in FIGURE 2, whose cut-off frequency $\omega_g$ is adjusted to the value of the difference frequency $\omega_D$. If the resistance value of the load resistor $R_a$ is higher than the rated resistance $Z=\sqrt{LC}$, then the increased resonance of the voltage appearing at the capacitance C tends to enlarge the useful signal. In a similar way, and instead of the shown low-pass filter, it is also possible to use a resonance transformer. Such types of selective networks are well-known in the art and therefore need not be explained in detail herein.

The switches S which are symbolically represented in FIGURE 1, and which serve to select the binary column inputs may be embodied in an electronic arrangement as shown in FIGURE 3. The leads extending via the series resistors $R_{v1}$, to the matrix columns, each extend to two gating circuits $T_1$ and $T_2$ of the same type, which are controlled in opposite senses by the trigger circuit KS. The trigger circuit consisting, e.g., of a flip-flop, is thus connected with its 0-output to the gating circuit $T_1$, and with its 1-output to the gating circuit $T_2$, so that one or the other of the gates is opened, and the column lead is connected through to one of the two outputs of the balanced transformer SÜ. The setting of the trigger circuit KS to either the 0- or 1-state, is effected in accordance with the binary input signal.

If the magnetic cores, after a learning phase carried out in several steps, are not yet in the state of saturation remanence $\pm B_s$, then, besides the sign, also the amount of induction B has to be evaluated. To this end there may likewise be used the difference frequency, because the amplitude $\hat{u}(\omega_D)$ is in proportion to the amount $|B|$. At saturation remanence $\pm B_s$, the amplitude $\hat{u}$ reaches a maximum. The summation row signal amplitude $u_{ges}$ is composed, in accordance with the progress of the learning process and the thus obtained induction values of the cores of different amplitude components $\hat{u}(\omega_D)$.

While we have described above the principles of our invention in connection with specific apparatus, it is to be clearly understood that this description is made only by way of example and not as a limitation to the scope of our invention as set forth in the objects thereof and in the accompanying claims.

What is claimed is:

1. An arrangement of apparatus for non-destructively interrogating a learning matrix—composed of a multiplicity of magnetic elements arrayed in rows and columns and having non-linear hysteresis characteristics—comprising:

first means for exciting each said column of elements with a first periodically varying signal having a predetermined first frequency and having a selected one of two predetermined, relative phases differing from each other by 180°;

second means for exciting all of said elements in common with a second periodically varying signal at a predetermined second frequency different from said first frequency;

third means coupled to each said element for producing an output signal corresponding to the magnetic response of the said element to the said first and second signals, said response signals including signal frequency components at the sum and difference of said first and second frequencies, and at one of two relative output phases different from each other by 180°, by virtue of the non-linear hysteresis action of said elements, the said output phase being determined by the input phase of said first signal and the state of magnetization of the said element;

means coupled to the third means in each said row for selecting and additively combining the said output signal frequency components at one of said sum and difference frequencies to produce row output signals at the frequency of the selected frequency component; and means coupled to said row output signal producing means for detecting the row position of the maximal row output signal at a given one of said two output phases.

2. An arrangement of apparatus according to claim 1 including means for additionally exciting all of said elements at the said one of said sum and difference frequencies and at said given one of said two output phases to thereby reduce row output signals at the other of said two output phases.

3. An arrangement of apparatus for non-destructively interrogating a learning matrix—composed of a multiplicity of magnetic cores, having non-linear hysteresis characteristics, and arrayed in rows and columns—comprising:

first and second sources of respective first and second periodically varying signals having respective first and second frequencies of variation;

said first source being provided with two signal output taps at which the said first signals differ in relative phase by 180°;

selecting means individually coupled between each said column of cores and said first source for selectively exciting the associated columns of cores with the opposite phase first signals at either of said output taps;

means coupled to said second source and to all of said cores for exciting said cores with said second signals;

means coupled individually to said rows of cores for electromagnetically sensing the combined magnetic variations thereof due to said first and second superposed signal excitations, said combined variation including frequency components at the sum and difference of said first and second frequencies by virtue of the mixing action due to the non-linear hysteresis of said cores, each said component having one of two relative output phases differing from each other by 180°, depending on the relative first signal phases selected by said column exciting means and on the states of magnetization of the cores in the said row;

means coupled to said row sensing means for selecting one of said sum and difference frequency components and for producing a row output signal corresponding thereto;

means coupled to one of said signal taps of said first source and to said second source for producing a compensating signal at said selected one of said sum and difference frequencies and at a predetermined one of said two output phases;

means for additionally exciting all of said cores with said compensating signal so as to lessen the contributions of signals at the other of said two output phases to the said row signals; and means coupled to said row output signal producing means for detecting the row position of the maximum row output.

4. An arrangement according to claim 3 wherein the frequency of said row output signal is said difference frequency and wherein the said difference frequency is low in comparison to both said first and said second frequency, and wherein said row output signal producing means is a simple low-pass filter.

References Cited by the Examiner

UNITED STATES PATENTS

| | | | |
|---|---|---|---|
| 2,973,508 | 2/1961 | Chadurjian | 340—174 |
| 3,123,706 | 3/1964 | French | 235—61.11 |
| 3,222,645 | 12/1965 | Davis | 340—174 |

BERNARD KONICK, *Primary Examiner.*

S. M. URYNOWICZ, *Assistant Examiner.*